United States Patent [19]
Teufel et al.

[11] 3,992,538
[45] Nov. 16, 1976

[54] SUBSTITUTED O-ACYL-ACRYL-ALDOXIMES

[75] Inventors: Hermann Teufel, Kelkheim, Taunus; Wilhelm Bartmann, Neuenhain, Taunus; Gerhard Beck, Frankfurt am Main; Ernold Granzer, Kelkheim, Taunus, all of Germany

[73] Assignee: Hoechst Aktiengesellschaft, Frankfurt am Main, Germany

[22] Filed: June 19, 1975

[21] Appl. No.: 588,186

[30] Foreign Application Priority Data

June 21, 1974 Germany ..................... 24297492

[52] U.S. Cl. .................. 424/327; 260/566 AE
[51] Int. Cl.² ............................. C07D 131/00
[58] Field of Search ............ 260/566 AE; 424/327

[56] References Cited
UNITED STATES PATENTS

| | | | |
|---|---|---|---|
| 3,169,989 | 2/1965 | Tieman et al. | 260/566 AE |
| 3,655,761 | 4/1972 | Gutman | 260/566 AE |
| 3,849,494 | 11/1974 | Middleton | 260/566 AE |

*Primary Examiner*—Gerald A. Schwartz
*Attorney, Agent, or Firm*—Curtis, Morris & Safford, P.C.

[57] ABSTRACT

Substituted O-acyl-acrylaldoximes of the formula I

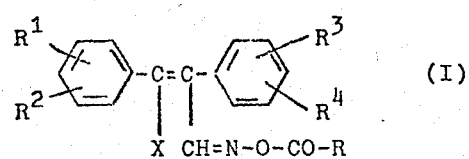

(I)

in which X denotes a chlorine or bromine atom, R is an alkyl, alkoxy or alkylamino group, alkenyl, alkenoxy or alkenylamino group each having 1 to 12 carbon atoms, or an aryl-, aryloxy, arylalkyl, arylalkoxy, arylamino or arylalkylamino group optionally substituted by one or two alkyl groups of 1 to 6 carbon atoms, and $R^1$, $R^2$, $R^3$, and $R^4$ are identical or different and each is a hydrogen atom, a halogen atom or an alkyl or alkoxy group of 1 to 6 carbon atoms, are disclosed, as are a process for preparing them and pharmaceutical preparations containing them as active ingredient.

3 Claims, No Drawings

SUBSTITUTED O-ACYL-ACRYLALDOXIMES

The present invention relates to substituted O-acyl-acryl-aldoximes.

The O-acyl-2,3-diaryl-3-halogen-acrylaldoximes of this invention have the formula I

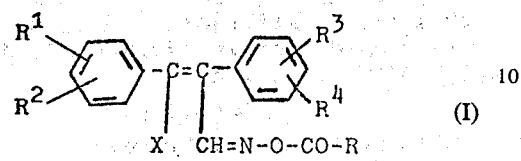

in which X is a chlorine or bromine atom, R is an alkyl, alkenyl, alkoxy, alkenoxy or alkylamino group each having 1 to 12 carbon atoms, or an aryl, aryloxy, arylalkyl, arylalkoxy, arylamino or arylalkylamino group optionally substituted by one or two alkyl groups each having 1 to 6 carbon atoms, and $R^1$, $R^2$, $R^3$ and $R^4$ are identical or different and each is a hydrogen atom, a halogen atom or an alkyl or an alkoxy group each having 1 to 6 carbon atoms.

The preferred meanings given for the substituent R are the alkyl, alkenyl, alkoxy, alkenoxy and alkylamino groups having 1 to 6 carbon atoms, for example, methyl, ethyl, propyl, iso-propyl, butyl, isobutyl, tertio-butyl, pentyl, hexyl and the corresponding unsaturated radicals, moreover, methoxy, ethoxy, propoxy, butoxy and allyloxy. Suitable alkyl or alkenyl radicals having up to 12 carbon atoms are also cycloalkyl or cycloalkenyl radicals, the radicals having 5 to 8 carbon atoms being preferred, for example, cyclopentyl, cyclohexyl, cyclooctyl and the corresponding radicals having an ethylenic double bond.

Aryl especially means naphthyl and phenyl.

The substituents $R^1$ to $R^4$ preferably denote chlorine and bromine atoms and alkyl and alkoxy groups having 1 to 3 carbon atoms, for example, methyl, ethyl, propyl and iso-propyl. The preferred compounds are those in which at least one of the substituents $R^1$ to $R^4$ is not hydrogen.

This invention further relates to a process for the manufacture of substituted O-acyl-acrylaldoximes as well as pharmaceutical preparations.

The process of the invention comprises reacting 2,3-diaryl-3-halogen-acrylaldoximes of the formula II

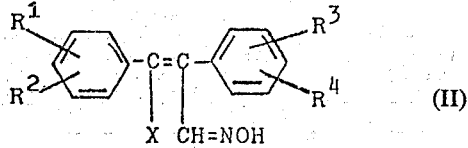

in which X, $R^1$, $R^2$, $R^3$ and $R^4$ are defined as in formula (I), in the presence of aprotic solvents with the aid of acylating agents to give O-acyl-2,3-diaryl-3-halogen-acrylaldoximes of the formula I.

Suitable acylating agents are above all carboxylic acid halides, carboxylic acid azides, carboxylic acid esters, carboxylic acid anhydrides, arylsulfonyloxy carboxylic acids, alkylsulfonoxycarboxylic acids and ketones, as well as isocyanates. The acylation is usually carried out at a temperature ranging from 15 to 30° C., preferably at room temperature; suitable aprotic solvents are halogenated, preferably chlorinated aliphatic hydrocarbons having 1 to 6, preferably 1, 2 or 3 carbon atoms or aromatic hydrocarbons having 6 to 9, preferably 6 or 7, carbon atoms, for example methylene chloride, chloroform, ethylene chloride, ethylidene chloride, benzene and toluene.

The 2,3-diaryl-3-halogen-acryl-aldoximes of the formula II required as starting material are preferably obtained by converting the 2,3-diaryl-3-halogen-acrylaldehydes of the formula III

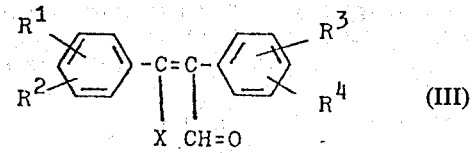

for example with hydroxylaminehydrochloride into the oximes. The compounds of the formula III can be prepared in known manner from desoxybenzoins under the conditions of the Vilsmeier reaction (cf. for example German Offenlegungsschrift No. 2 160 236).

The O-acyl-2,3-diaryl-3-halogen-acrylaldoximes have valuable pharmacological properties and can be used as medicaments or in medicaments. They have a strong hypolypemic action; they lower the cholesterol level and the triglyceride level. For this reason, the compounds can be used for the treatment of primary hyperlipemiae and of certain secondary hyperlipemiae, which may occur, for example in diabetes.

Since hyperlipemia is the most dangerous cause of coronary heart diseases and, generally speaking, elevated serum lipid values involve a great risk of causing arteriosclerotic diseases, the reduction of elevated serum lipid levels is extremely important for the prevention and therapy of arteriosclerosis, especially, of the coronary heart vessels. The above-specified substances are useful for the treatment and prevention of arteriosclerotic diseases, especially of the coronary vessels, but also of other blood vessels.

The hypolipemic activity of the compounds of the invention can be demonstrated on male rats having normal serum lipid content (cf. Example 13).

The novel compounds may be administered either as such or in admixture with pharmacologically acceptable carriers and, if desired, further active substances. The oral dosage unit form is preferred. For this purpose, the active compounds may be mixed with known excipients and brought into suitable dosage unit forms according to known methods, for example tablets, hard gelatine capsules, aqueous or oily suspensions or aqueous or oily solutions. Suitable inert carriers are for example magnesium carbonate, lactose or corn starch, if desired with the addition of further auxiliaries, such as for example lubricants or binders, for example magnesium stearate. The compositions may be obtained by dry or moist granulation. Suitable oily carriers or solvents are especially vegetable and animal oils, for example sunflower oil or cod-liver oil.

The compounds of the invention are used in a dosage unit of about 0.1 to 100, preferably 1 to 25 mg./kg., particularly in combination with other active substances, among which may be mentioned for example glycodazine, tolbutamide, glibenclamide, phenformine, buformine and metformine, or agents acting on the circulatory system in a larger sense, but especially those dilating the coronary vessels, such, for example, as chromonar or prenyl amine, blood pressure lowering substances, for example Reserpin, α-methyl-dopa or clonidine, geriatrics, psychopharmaceutics, for example, chlordiazepoxide, diazepam, or meprobamate, vitamins and other agents lowering the lipid level.

The following examples illustrate the invention:

EXAMPLE 1:

10 g. of 2-(4-methoxyphenyl)-3-chloro-p-methoxy-cinnamic aldoxime were introduced into 50 ml. of acetanhydride and stirred at room temperature. After about 1 hour the total of oxime was dissolved. After 2.5 hours 2-(4-methoxyphenyl)-3-chloro-p-methoxy-cinnamic aldoxime-O-acetate precipitated as crystals which were recrystallized from methanol/water (melting point: 130–132° C.).

EXAMPLE 2:

2-(4-methoxyphenyl)-3-chloro-p-methyl-cinnamic-aldoxime-O-acetate was prepared according to Example 1 (melting point: 128–130° C.).

EXAMPLE 3:

2-Phenyl-3-chloro-p-ethoxy-cinnamicaldoxime-O-acetate was prepared according to Example 1 (melting point: 118–119° C.).

EXAMPLE 4:

3.17 g. of 3-(4-methoxyphenyl)-3-chloro-p-methoxy-cinnamic aldoxime were stirred for 3 hours at room temperature with 30 ml. of methylene chloride, 4 g. of benzoyl chloride and 2.5 g. of potassium carbonate. The mixture was worked up by diluting it with methylene chloride, about 30 ml. of water were added, the mixture was shaken thoroughly and the methylene chloride phase was separated. After drying and evaporating the solution under reduced pressure, 2-(4-methoxyphenyl)-3-chloro-p-methoxy-cinnamic aldoxime-O-acetate was obtained, which was recrystallized from ethanol (melting point: 146–147° C.).

EXAMPLE 5:

O-caprinoyl-2-(4-methoxyphenyl)-3-chloro-p-methoxy-cinnamic aldoxime was prepared according to Example 4 and was recrystallized from a mixture of ethanol and water (melting point: 71–73° C.).

EXAMPLE 6:

O-phenylacetyl-2-(4-methoxyphenyl)-3-chloro-p-methoxy-cinnamic aldoxime was prepared according to Example 4 (melting point: 110–111° C.).

EXAMPLE 7:

O-cyclohexanoyl-2-phenyl-3-chloro-p-methyl-cinnamic aldoxime was prepared according to Example 4 (melting point: 122° C.).

EXAMPLE 8:

O-cyclohexanoyl-2-phenyl-3-chloro-p-methoxy-cinnamic aldoxime was prepared according to Example 4 (melting point: 112° C.).

EXAMPLE 9:

2 g. of phenyl-3-chloro-p-methyl-cinnamic aldoxime were suspended in 20 ml. of absolute methylene chloride to which the equimolar amount of phenyl isocyanate was added. The reaction solution became clear already after short stirring at room temperature and was allowed to stand for about 12 hours at room temperature. Then, the solution was evaporated and the solid residue was boiled out with methanol. When the filtered methanolic solution became cold, all white, interlocking crystals of 2-phenyl-3-chloro-p-methyl-cinnamic aldoxime-O-(N-phenyl-carbamate) precipitated which melted at 108° C. under decomposition.

EXAMPLE 10:

2-Phenyl-3-chloro-p-methoxy-cinnamic aldoxime-O-(N-phenyl-carbamate) was prepared according to Example 9 (melting point: 124° C., decomposition).

EXAMPLE 11:

2-(4-Methoxyphenyl)-3-chloro-p-methoxy-cinnamic aldoxime-O-(N-m-trifluoromethylphenyl-carbamate) was prepared according to Example 9 (melting point: 170–171° C., decomposition).

EXAMPLE 12:

2-Phenyl-3-chloro-p-methyl-cinnamic aldoxime-O-(N-m-trifluoromethylphenyl-carbamate) was prepared according to Example 9 (melting point: 155 to 160° C., decomposition).

EXAMPLE 13:

The hypolipemic activity of the compound obtained according to Example 1 was determined on male rats having normal serum lipid content. For this purpose, the change of the serum concentration of certain lipid classes was determined after an eight days' treatment of the test animals with different dosage units per day. For comparison, the known lipid lowering agent Clofibrat was subjected to the same test.

The substance to be tested was administered per os as dosage unit by means of an esophagal sound. Prior to and after the treatment, blood samples were taken from the test animals and the concentration of cholesterol in the Serum was determined according to the method of Lauber and Richterich and that of the triglycerides according to the method of Eggstein and Kreutz. In the following Table, the changes in the serum lipid values due to the treatment with the substances were defined as follows:

(a) The changes in percent of the final value of the treated group, referred to the initial value of the treated group, the initial value being 100 percent.

(b) The change in the final value of the treated group, referred to the final value of an accompanying untreated control group (Placebo group), the untreated control group's value being defined as 100 percent. Thus, the values given under (a) represent the change in percent as compared to the initial values, the values given under (b) represent the change in percent of the treated group, referred to the untreated control group.

TABLE

| Dose (mg/kg) | Change of the medium serum-total cholesterol level (in %) | | Change of the medium serum-total-triglyceride level (in %) | |
|---|---|---|---|---|
| | a | b | a | b |
| 1 | −38 | −28 | −8 | |
| 10 | −61 | −55 | −28 | −13 |
| 100* | −25 | −17 | −21 | −15 |

*Comparison test carried out with Clofibrat.

We claim:

1. A substituted O-acyl-acrylaldoxime of the formula

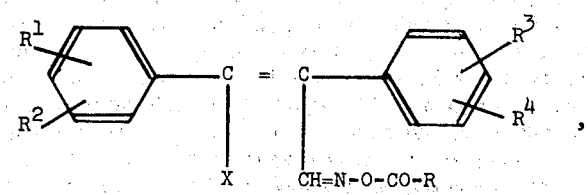

wherein X is chlorine or bromine; R is alkyl, alkoxy, alkylamino, alkenyl, alkenoxy, or alkenylamino each having 1 to 12 carbon atoms, or is aryl, aryloxy, arylalkyl, arylalkoxy, arylamino, or arylalkylamino, or is aryl, aryloxy, arylalkyl, arylalkoxy, arylamino, or arylalkylamino mono- or di-substituted by alkyl having 1 to 6 carbon atoms; and $R^1$, $R^2$, $R^3$, and $R^4$, which may be the same or different, are hydrogen, halogen, or alkyl or alkoxy having 1 to 6 carbon atoms.

2. A hypolypenic medicament comprising an O-alkyl-acrylaldoxime as in claim 1 in combination with a pharmaceutically acceptable carrier.

3. A method for treating a patient suffering from hyperlipemia which comprises administering an effective amount of an O-acyl-acrylaldoxime as in claim 1.

* * * * *